UNITED STATES PATENT OFFICE.

FREDERICK PRIESTMAN, OF BURLINGTON, IOWA.

COMPOSITION FOR REMOVING PAINT OR VARNISH.

SPECIFICATION forming part of Letters Patent No. 705,139, dated July 22, 1902.

Application filed October 14, 1901. Serial No. 78,592. (No specimens.)

*To all whom it may concern:*

Be it known that I, FREDERICK PRIESTMAN, a citizen of the United States, residing in Burlington, in county of Des Moines and State of Iowa, have invented a new and useful composition of matter to be used for the removal of paint or varnish from wood, leaving the wood in its natural state, of which the following is a specification.

In using this preparation there is no injury to either hands or brush.

My composition of the following ingredients, combined in the proportions stated, viz: Dissolve sal-soda, twenty pounds, in five (5) gallons hot water. Let stand over fire until all is melted. Then add one (1) pint fusel-oil, one (1) quart kerosene, one (1) pint aqua-ammonia, twenty-eight per cent., successively, in order named, stirring slowly until thoroughly mixed.

This preparation works perfectly in warm weather. In cold weather the sal-soda is apt to settle. Therefore it works better if warmed.

In using the above-named composition old or new paint or varnish can be completely removed by applying with an old clean paint-brush. Soak thoroughly by rubbing and working the brush back and forward until the paint or varnish begins to work up thick and muddy, when the surface undergoing the renovation is to be washed off thoroughly with pure water. Then if the paint or varnish is not sufficiently removed apply the preparation once more and after allowing it to eat awhile, but not waiting until it dries, wash again thoroughly with pure water, when the desired result will be attained.

What I claim, and desire to secure by Letters Patent of the United States, is—

The herein-described composition of matter for removing paint and varnish, consisting of sal-soda, water, fusel-oil, kerosene and aqua-ammonia substantially as described.

In testimony whereof I have signed my name to this specification in the presence of two subscribing witnesses.

FRED. PRIESTMAN.

Witnesses:
 CLARENCE CAMERON,
 ED DARIES.